US007925988B2

(12) United States Patent
Abernethy, Jr. et al.

(10) Patent No.: US 7,925,988 B2
(45) Date of Patent: Apr. 12, 2011

(54) SYSTEM AND METHOD FOR PROVIDING STICKY APPLICATIONS

(75) Inventors: Michael N. Abernethy, Jr., Pflugerville, TX (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 11/938,907

(22) Filed: Nov. 13, 2007

(65) Prior Publication Data
US 2009/0125833 A1    May 14, 2009

(51) Int. Cl.
    *G06F 3/048*    (2006.01)
(52) U.S. Cl. ......... 715/779; 715/765; 715/810; 715/804
(58) Field of Classification Search .................. 715/733, 715/738, 744, 764, 765, 779, 781, 784, 788, 715/800, 803, 804, 805, 810
See application file for complete search history.

(56) References Cited

U.S. PATENT DOCUMENTS

| | | | |
|---|---|---|---|
| 5,821,931 | A | 10/1998 | Berquist et al. |
| 6,313,855 | B1 | 11/2001 | Shuping et al. |
| 6,765,592 | B1 | 7/2004 | Pletcher et al. |
| 2003/0088640 | A1 | 5/2003 | Rasheed et al. |
| 2005/0188350 | A1 * | 8/2005 | Bent et al. ..................... 717/106 |
| 2005/0223315 | A1 * | 10/2005 | Shimizu et al. ............... 715/512 |
| 2007/0083806 | A1 | 4/2007 | Boyles et al. |
| 2009/0083655 | A1 * | 3/2009 | Beharie et al. ................ 715/781 |

FOREIGN PATENT DOCUMENTS

DE    102 18 892 A1    11/2003

OTHER PUBLICATIONS

Omar Al Zabir, "StickOut: A Desktop Sticky Notes Application in the .NET Framework 2.0", Mar. 2006, Microsoft Corporation, 69 pages.*
International Search Report and Written Opinion dated Feb. 27, 2009 for International Application No. PCT/EP2008/065412, 10 pages.

* cited by examiner

*Primary Examiner* — Xiomar Bautista
(74) *Attorney, Agent, or Firm* — Stephen J. Walder, Jr.; Jeffrey S. LaBaw

(57) ABSTRACT

A system and method for providing sticky applications are provided. A "sticky application" is an operating system (OS) level application that has the ability to "stick" to web applications and become a part of the web page on which the web application is running. While the sticky application is stuck to the web application, it behaves as if it were a web application with respect to the user. When the user chooses to "unstick" the application, it will return to behaving as an OS level application. The sticky application imitates being a web-based application instead of an operating system level application while stuck. This imitation involves the sticky application being placed on pixel coordinates within a web page of the web application and the sticky application remaining in the pixel coordinates within the web page where it is placed even when a user modifies the representation of the web page.

25 Claims, 8 Drawing Sheets

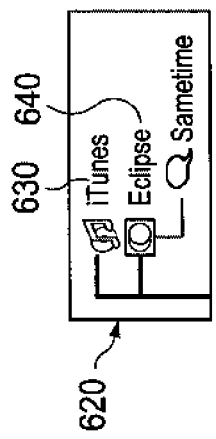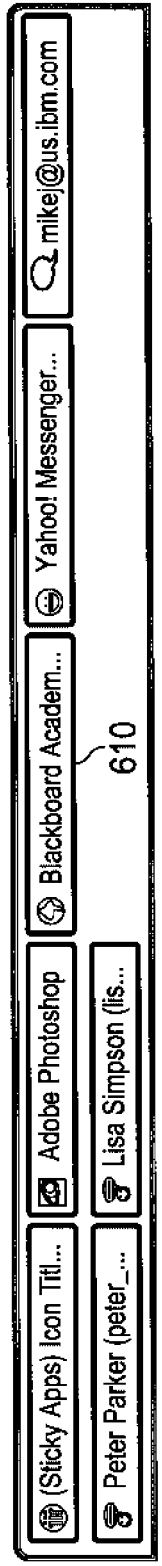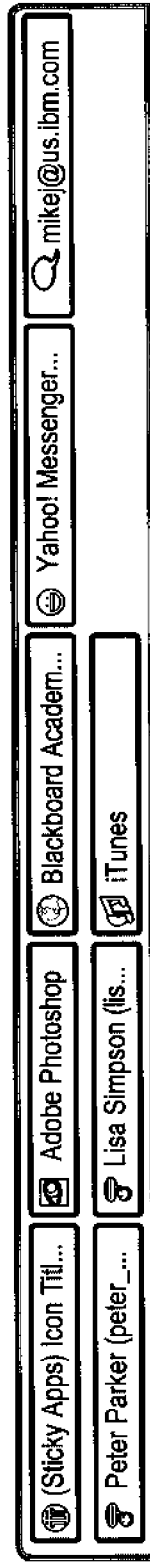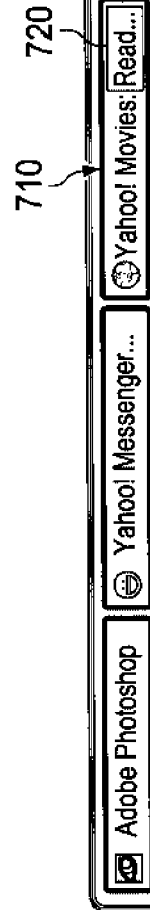
FIG. 6A   FIG. 6B   FIG. 7

SYSTEM AND METHOD FOR PROVIDING STICKY APPLICATIONS

BACKGROUND

1. Technical Field

The present application relates generally to an improved data processing system and method. More specifically, the present application is directed to a system and method for providing sticky applications.

2. Description of Related Art

Because of the virtually worldwide acceptance of the Internet, and the World Wide Web, as an infrastructure for modern exchange of information, commerce, and the like, the proliferation of web-based applications is on the rise. Moreover, the software that enables such web-based applications has become easier to use and more readily available as continued advances in this area occur. For example, web-based application technologies such as Flash, Ajax, and the like, promise to revolutionize the web-based application environment.

However, it should be appreciated that there is still a great divide between web-based applications and traditional operating system based applications. That is, web-based applications, or simply web applications, operate in a domain associated with the web browser of a client computing device while traditional operating system based applications operate in a separate domain associated with the operating system. Typically, an operating system based application interfaces with the operating system, its associated device drivers, and the like, to perform various operations including input/output operations and the like. Basically, the operating system manages the use of resources of the client computing device for the operating system based applications. At the foundation of all system software, the operating system performs basic tasks such as controlling and allocating memory, prioritizing system requests, controlling input and output devices, facilitating networking and managing file systems. The operating system forms a platform for other system software and for operating system based application software.

Web applications provided by a server computing device, on the other hand, generate a series of web documents in a standard format supported by common web browser applications of client computing devices. Client-side scripting in a standard language, such as JavaScript, is commonly included to add dynamic elements to the user interface. Generally, each individual web page is delivered to the client computing device as a static document, but the sequence of pages can provide an interactive experience, as user input is returned through Web form elements embedded in the page markup. During a session, the web browser interprets and displays the pages, and acts as the universal client for any Web application. A significant advantage of web applications that support standard browser features is that they perform as specified regardless of the operating system or OS version installed on a given client computing device.

While web applications are becoming more prevalent, operating system based applications will continue to be used for the foreseeable future. Operating system based applications will remain in widespread use because people are used to these types of applications and because business institutions, government institutions, and individuals have invested large amounts of capital in obtaining such operating system based applications for use in their organizations and homes.

With this dichotomy in applications, it can be appreciated that it is often the case that a user of a computing device, such as a client computing device, will use both web applications and operating system based applications in a single session. For example, using a Microsoft Windows™ operating system environment, a user may utilize his/her web browser to access a web application, via a web browser, in one window while also accessing an operating system based application in another separate window. In such a case, when the user is accessing one window over the other, the non-accessed window is not able to be interacted with, and often times is not even visible on the display. In other words, the non-accessed window becomes essentially non-active. As a result, a user must constantly switch between the window in which the web-based application is presented and the window in which the operating system based application is presented in order to make use of both applications at substantially the same time. This is inconvenient to the user, can be a source of frustration, reduces the speed at which tasks may be performed by the user, and can result in loss of data in some instances.

SUMMARY

The illustrative embodiments provide a system and method for providing sticky applications. A "sticky application" is an operating system level application that has the ability to "stick" to web applications and become a part of the web page on which the web application is running. While the sticky application is stuck to the web application, it will behave as if it were a web application with respect to the user. When the user chooses to "unstick" the application from the web application, it will return to behaving as an operating system level application.

The sticky application of the illustrative embodiments imitates being a web-based application instead of an operating system level application. In one illustrative embodiment, this imitation involves the sticky application being placed on pixel coordinates within a web page of the web application and the sticky application remaining in the pixel coordinates within the web page where it is placed. Thus, for example, when the web page is scrolled, the sticky application would scroll as well. Moreover, when the web page is resized within the browser application, the sticky application would remain in the same pixel coordinates and be resized as well. When the browser is redirected to another web page, the sticky application will not be visible, as it is tied to a single web page and its coordinates.

The sticky application can be "stuck" to any pixel coordinates on a web page. This does not limit the location of the sticky application and thus, the sticky application may be placed entirely within the browser application's borders or it can even be placed overlapping the borders of the browser application. Thus, the sticky application may be left "hanging" off the end of the browser application.

In one illustrative embodiment, the mechanisms of the illustrative embodiments include software support mechanisms provided in the operating system of the client computing device and the browser application. The additions to the operating system handle the "stickiness" of the sticky application and register with the browser application for events (such as scroll bar moved and page change events). The operating system may change its display of the sticky application depending on the events it receives from the browser application. Thus, when an operating system based application is made to be sticky, the operating system may register the pixel coordinates of the sticky application and how it is to be stuck on the browser application. When the browser application is scrolled, the operating system may receive events from the browser application and the operating system may redraw the sticky application appropriately. Additionally, when the web page is changed, the operating system may redraw the sticky application appropriately. Additionally, when the web page is changed, the operating system may receive events from the browser application and may hide the sticky application from visibility until that web page is returned to.

At no time is the sticky application stopped or paused when it is stuck to the web application. Thus, thread level support will not change on the operating system and the application will run unchanged. Only the visual display of the application is altered by "sticking" the application to the web page of the web application It should be appreciated that with the mechanisms of the illustrative embodiments, nested sticky applications may be generated. For example, a web application may have an operating system-based application stuck to it. This essentially causes the operating system-based application to become a part of the web application. As a result, additional operating system-based applications may be stuck to the sticky application already stuck to the original web page of the web application. Any number of operating system-based applications may be stuck to a web page of a web application and/or already present sticky applications.

In further illustrative embodiments, a taskbar may be provided in a display associated with the sticky applications, the taskbar having user information about a web application and the sticky applications it contains. For example, an icon and title for the main web application may be provided on the taskbar with a nested view of all the sticky applications that the main web application contains being presented in response to a user moving a cursor over the icon. From this nested view, a user may select a particular sticky application in the listing and, in so doing, make that application become unstuck from the main web application. Other alternative representations may also be used without departing from the spirit and scope of the illustrative embodiments.

Moreover, in yet another illustrative embodiment, the toolbar may be provided with functionality for display information pertaining to alerts that need to be displayed by sticky applications. This functionality allows the information to be conveyed to the user that a particular sticky application they have embedded in another main web application needs to display an alert.

In one illustrative embodiment, a method for representing a first application on a display of the data processing system is provided. The method may comprise receiving a command to stick a first graphical representation of a first application to a second graphical representation of a second application on the display of the data processing system and generating a third graphical representation of the first application. The third graphical representation of the first application may appear to be integrated with the second graphical representation of the second application. The first application may be interacted with by a user via the third graphical representation. The third graphical representation may be automatically modified in response to modifications to the second graphical representation of the second application. The first application may be an operating system (OS) level application and the second application may be a web based application. The second graphical representation may be a web page. Moreover, the second application may be an application whose graphical representation is already integrated with a web page of a web-based application.

Generating the third graphical representation may comprise identifying at least one relative pixel location of the first graphical representation relative to the second graphical representation, generating the third graphical representation at the at least one relative pixel location, and maintaining the at least one relative pixel location of the third graphical representation relative to the second graphical representation while the second graphical representation is modified. Maintaining the at least one relative pixel location of the third graphical representation relative to the second graphical representation may comprise, in response to receiving an input to scroll the second graphical representation, scrolling the third graphical representation a corresponding amount such that the at least one relative pixel location of the third graphical representation relative to the second graphical representation is maintained. Moreover, maintaining the at least one relative pixel location of the third graphical representation relative to the second graphical representation may comprise, in response to receiving an input to resize the second graphical representation, resizing the third graphical representation a corresponding amount such that the at least one relative pixel location of the third graphical representation relative to the second graphical representation is maintained.

Maintaining the at least one relative pixel location of the third graphical representation relative to the second graphical representation may comprise, in response to receiving an input to no longer display the second graphical representation, discontinuing display of the third graphical representation but maintaining the at least one relative pixel location of the third graphical representation relative to the second graphical representation in memory such that if the second graphical representation is again displayed, the third graphical representation is also displayed at the at least one relative pixel location.

The method may further comprise generating a taskbar representation output on the display, wherein the taskbar comprises a first taskbar portion identifying the second application and generating a second taskbar portion in association with the first taskbar portion, the second taskbar portion identifying the first application as being stuck to the second application. The second taskbar portion may comprise a hierarchical representation of applications stuck to the second application. Individual applications stuck to the second application may be selected from the hierarchical representation in order to perform operations on the applications stuck to the second application.

Moreover, the method may comprise receiving an alert notification from the first application and modifying an output characteristic of a portion of the first taskbar portion to identify the receipt of the alert notification. The portion of the first taskbar portion may be a portion of the first taskbar portion corresponding to characteristics of the third representation relative to the second representation. The characteristics of the third representation relative to the second representation may comprise at least one of a relative pixel location of the third representation relative to the second representation or a size of the third representation relative to the second representation.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6A is an exemplary diagram illustrating a task bar representation of stick applications in accordance with one illustrative embodiment;

FIG. 6B is an exemplary diagram illustrating a task bar representation after unsticking a sticky application in accordance with one illustrative embodiment;

FIG. 7 is an exemplary diagram illustrating a task bar representation of alerts in sticky applications in accordance with one illustrative embodiment;

DETAILED DESCRIPTION OF THE ILLUSTRATIVE EMBODIMENTS

The illustrative embodiments provide a system and method for providing sticky applications. In particular, the illustrative embodiments provide mechanisms for integrating an operating system level application into a web-based application's web page such that the operating system level application appears to be part of the web-based application's web page but continues to operate in a manner expected by an operating system level application. Thus, the operating system level application is "stuck" to the web page, thereby constituting a sticky application.

Because the mechanisms of the illustrative embodiments are directed to sticking operating system level applications to web pages of web-based applications, the mechanisms of the illustrative embodiments are especially well suited for use in a distributed data processing environment in which at least one server computing device hosts one or more web-based applications which provide web pages to one or more client computing devices which themselves may run operating system level applications. Alternatively, the web-based application may be run by the client device yet contact the server computing device to obtain information for rendering a web page on the client device. The illustrative embodiments provide mechanisms for allowing the client computing devices to integrate their operating system level applications into the web pages generated by web-based applications through a sticky application operation, as discussed in greater detail hereafter.

Figure 1:
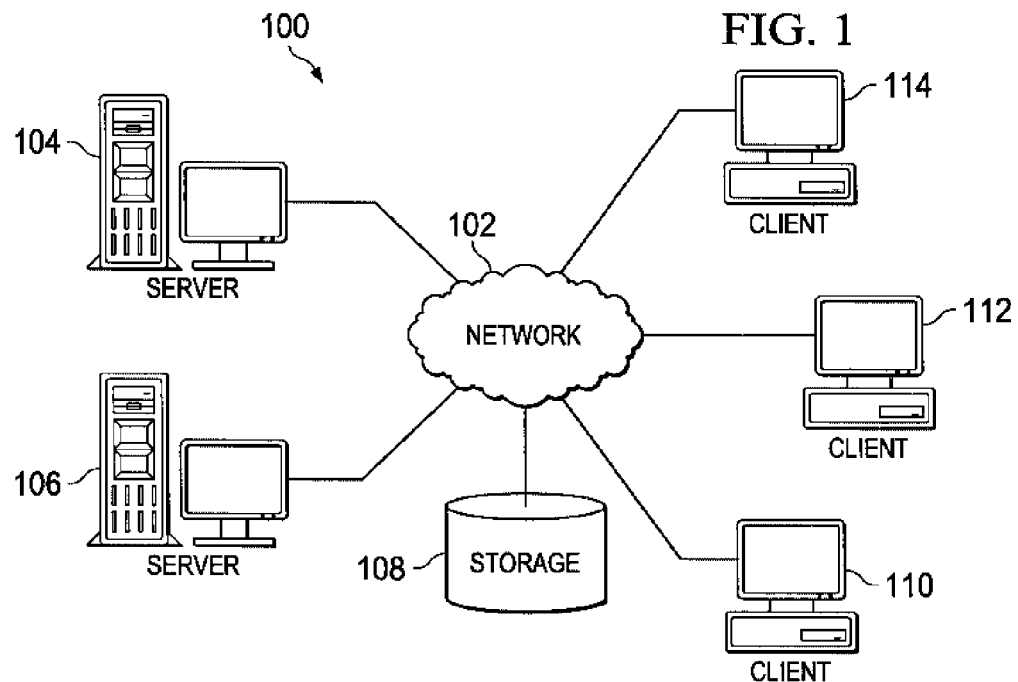
FIG. 1 is an exemplary representation of an exemplary distributed data processing system in which aspects of the illustrative embodiments may be implemented.
Figure 2:
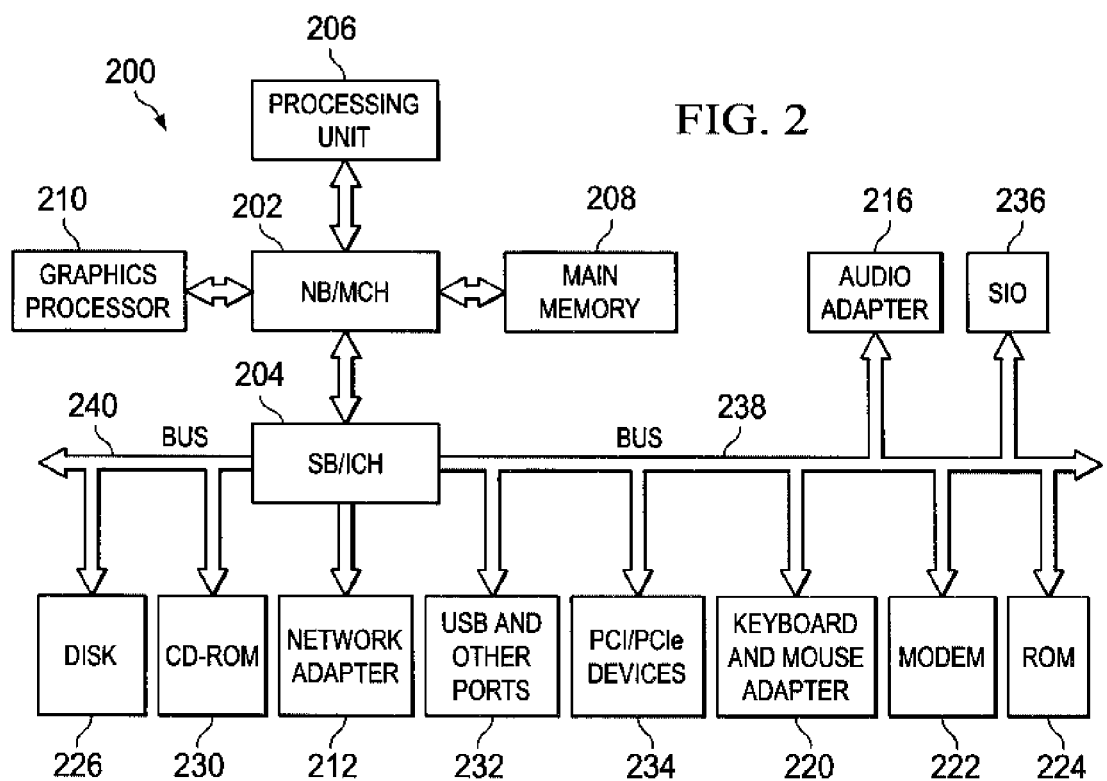
FIG. 2 is a block diagram of an exemplary data processing system in which aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HUD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Returning to FIG. 1, it should be appreciated that while a user is using a web browser application on a client device, such as client device 110, to access web content from one or more web-based applications on one or more server computing devices, such as servers 104 and 106, the user may also have one or more operating system level applications running on the client device 110 that he/she wishes to access in substantially a parallel manner with regard to the web content. It should be appreciated that a web-based application is an application that operates independent of the particular platform upon which it is executed either through use of an interpreter and/or web browser application. On the contrary, an operating system (OS) level application communicates with the operating system running on the client computing device to access operating system level resources of the client computing device and thus, may be more directly coupled with the operating system and platform upon which the operating system level application is executing. Web-based applications are purposefully limited from accessing operating system level resources for security reasons.

Typically, in such a situation, the web-based application and the OS level application are run as two separate instances on the client computing device. For example, in a Microsoft Windows™ operating system environment, the web-based application may be run in one window that executes a web browser application through which the web-based application is executed, and the OS level application may be run in a separate window. Thus, if a user wishes to use both applications contemporaneously, the user is forced to repeatedly switch between the two windows, i.e. making the first window active to work in the web-based application, and then de-activating the first window by selecting the second window to be active in order to work in the OS level application, or make both applications' representations on the display device smaller so they will fit in the available display area of the display device. This may be especially troublesome when the windows overlap to some degree causing one window or the other to be non-visible while a different window is active and when reducing the size of an applications' representation causes the content of the representation to be not recognizable or difficult to view.

As an example, consider a standard Microsoft Windows™ environment in which a web-browser application is running in one window on the desktop and a second window is used to access an OS level chat program, such as an instant messaging program. While the user is accessing the web-browser application, such as a web-based word processor, database application, or the like, the user may wish to be able to continue communications with other parties via the instant messaging program. Typically, the user must switch between the windows being active in order to access both programs. This may cause one program to become non-visible and not accessible while the other program is being accessed. Thus, while the user is using the web-based word processor or database application, he/she will not be able to interact with the chat program. Similarly, while the user is accessing the chat program, he/she will not be able to access the word processor or database application. Moreover, it is possible that the user may not even be able to view the other application. Thus, it would be more convenient to the user to be able to have both applications accessible through the same window or instance in the operating system such that both applications may be interacted with out having to activate one application and deactivate the other application.

Some chat programs, and other applications, have a display option that allows the window displaying the chat program interface to remain on top of all other application windows on a desktop. This is referred to as an "always-on-top" window feature of an application. While this allows the separate "always-on-top" window of the application to be consistently visible, many times the "always-on-top" window obscures windows below it such that content of the other windows is not visible. Thus, again, due to the fact that the applications must be represented in separate windows of the desktop, one window's content may be not visible because of another window's content being represented "on-top" of it.

Other situations arise where it would be convenient to access two or more applications of various levels, i.e. web-based application level and operating system level applications. For example, a user may be working with the operating system level application Adobe Photoshop™ and may want to draw a picture from a website. In such a situation it would be very inconvenient to have to keep switching between the instance of Adobe Photoshop™ and the instance of the web-browser displaying the web page generated by the web-based application. As another example, a user working on a web-based word processor, database application, or the like, may wish to use a version of Apple iTunes™ to listen to music and may not wish to continually switch between the web-based application and the OS level iTunes™ application to switch songs being played.

The illustrative embodiments provide a system and method for providing sticky applications. A "sticky application" is an operating system level application that has the ability to "stick" to web-based applications, also referred to as web applications, and become a part of the web page on which the web application is running. While the sticky application is stuck to the web application, it will behave as if it were a web application with respect to the user. When the user chooses to "unstick" the application from the web application, it will return to behaving as an operating system level application.

The sticky application of the illustrative embodiments imitates being a web-based application instead of an operating system level application. In one illustrative embodiment, this imitation involves the sticky application being placed on pixel coordinates within a web page of the web application and the sticky application remaining in the pixel coordinates within the web page where it is placed. Thus, for example, when the web page is scrolled, the sticky application would scroll as well. Moreover, when the web page is resized within the browser application, the sticky application would remain in the same pixel coordinates and be resized as well. When the browser is redirected to another web page, the sticky application will not be visible, as it is tied to a single web page and its coordinates.

The sticky application can be "stuck" to any pixel coordinates on a web page. This does not limit the location of the sticky application and thus, the sticky application may be placed entirely within the browser application's borders or it can even be placed overlapping the borders of the browser application. Thus, the sticky application may be left "hanging" off the end of the browser application.

In one illustrative embodiment, the mechanisms of the illustrative embodiments include software support mechanisms provided in the operating system of the client computing device and the browser application. The additions to the operating system handle the "stickiness" of the sticky application and register with the browser application for events (such as scroll bar moved and page change events). The operating system may change its display of the sticky application depending on the events it receives from the browser application. Thus, when an operating system based application is made to be sticky, the operating system may register the pixel coordinates of the sticky application and how it is to be stuck on the browser application. When the browser application is scrolled, the operating system may receive events from the browser application and the operating system may redraw the sticky application appropriately. Additionally, when the web page is changed, the operating system may redraw the sticky application appropriately. Additionally, when the web page is changed, the operating system may receive events from the browser application and may hide the sticky application from visibility until that web page is returned to.

At no time is the sticky application stopped or paused when it is stuck to the web application. Thus, thread level support will not change on the operating system and the application will run unchanged. Only the visual display of the application is altered by "sticking" the application to the web page of the web application It should be appreciated that with the mechanisms of the illustrative embodiments, nested sticky applications may be generated. For example, a web application may have an operating system-based application stuck to it. This essentially causes the operating system-based application to become a part of the web application. As a result, additional operating system-based applications may be stuck to the sticky application already stuck to the original web page of the web application. Any number of operating system-based applications may be stuck to a web page of a web application and/or already present sticky applications.

In further illustrative embodiments, a taskbar may be provided in a display associated with the sticky applications, the taskbar having user information about a web application and the sticky applications it contains. For example, an icon and title for the main web application may be provided on the taskbar with a nested view of all the sticky applications that the main web application contains being presented in response to a user moving a cursor over the icon. From this nested view, a user may select a particular sticky application in the listing and, in so doing, make that application become unstuck from the main web application. Other alternative representations may also be used without departing from the spirit and scope of the illustrative embodiments.

Moreover, in yet another illustrative embodiment, the toolbar may be provided with functionality for display information pertaining to alerts that need to be displayed by sticky applications. This functionality allows the information to be conveyed to the user that a particular sticky application they have embedded in another main web application needs to display an alert.

Figure 3:
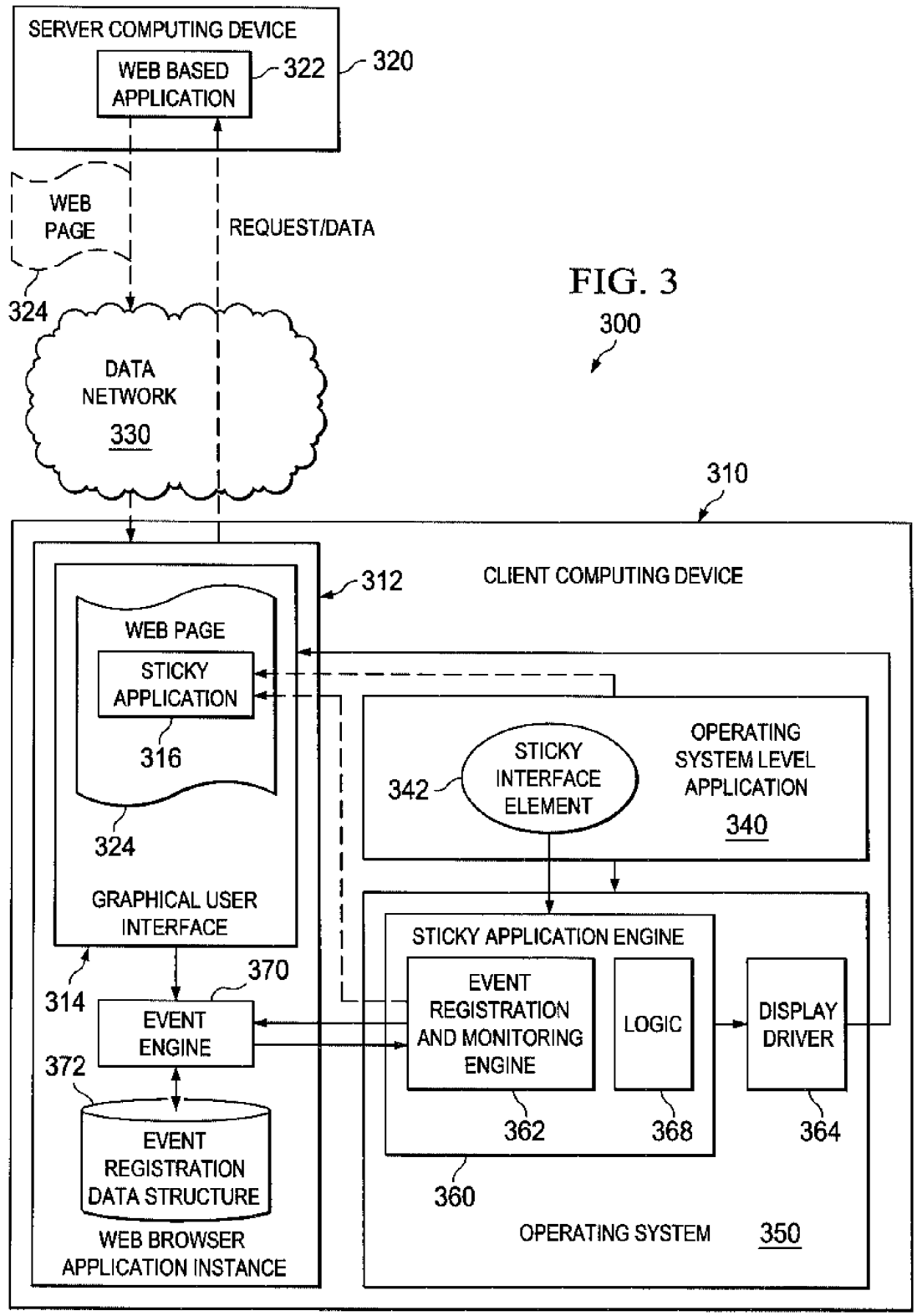
FIG. 3 is an exemplary diagram illustrating the primary operational components of a sticky application engine in accordance with one illustrative embodiment.

FIG. 3 is an exemplary diagram illustrating the primary operational components of a sticky application engine in accordance with one illustrative embodiment. As shown in FIG. 3, a client computing device 310 may communicate with a server computing device 320 via one or more data networks 330 to obtain access to functionality provided by a web-based application 322 hosted by the server computing device 320. In response to requests and/or data transmission from the client computing device 310, the web based application 322 on the server computing device 320 may return a web page 324 representing the results of the web based application 322 processing the requests and/or data transmission. This web page 324 may provide an interface through which the user of the client computing device 310 may communicate with the web based application 322, e.g., providing a database interface, web-based word processor interface, or the like.

The client computing device 310 may communicate with the web based application 322 via a web browser application instance 312 running on the client computing device 310. Through this web browser application instance 312, a graphical user interface 314 is provided through which the web page 324 may be represented in to the user, i.e. via a graphical display, audible output, and the like. It is also via this graphical user interface 314 that a user may interface with the web page 324 to provide data to, or obtain data from, the web based application 322. The above description of the operation of the elements in FIG. 3 is basically directed to a known mechanism for communicating between a web browser application instance of a client computing device and a web based application provided by a server computing device. The following description focuses on the improvements made by the mechanisms of the illustrative embodiment with regard to the implementation of sticky applications.

Again, as shown in FIG. 3, the client computing device 310, in addition to running the web browser application instance 312, may run an operating system (OS) level application 340 via an operating system 350. In accordance with the mechanisms of the illustrative embodiments, the operating system 350 provides a sticky application engine 360 for providing OS support for establishing sticky applications in representations of web pages, such as web page 324, via the graphical user interface 314 of the web browser application instance 312. As discussed above, a sticky application is an operating system level application, such as OS level application 340 that has been integrated into the web page representation generated by a web application, such as web-based application 322, via a web browser, such as via the graphical user interface 314 of a web browser application instance 312, running on a client computing device, such as client computing device 310. When integrated, the sticky application's representation is as if it is part of the web page although the operating system still provides thread level support for the application. Thus, the representation of the sticky application is that of a web application while the execution of the sticky application on the client computing device 310 is that of an OS level application.

The sticky application engine 360 interfaces with a sticky interface element 342 provided in the representation of the OS level application 340 on the client computing device 310, a display driver 364 associated with the operating system 350, and an event engine 370 of the web browser application instance 312. The sticky application engine 360 provides logic 368 for generating sticky application representation 316 of an OS level application 340 in response to a user implementing the sticky application functionality via the sticky interface element 342 of the OS level application 340 representation. For example, in the representation of an OS level application 340 on a display of the client computing device 310, a toolbar button or other graphical user interface element representing the sticky interface element 342 may be provided that is selectable by a user via a user interface device, e.g., a mouse, keyboard, pointing device, or the like.

In response to the user selecting the sticky interface element 342, the sticky application engine 360 may instruct the user to drag-and-drop or otherwise designate the location where the sticky application 316 is to be placed on the web page 324 representation provided via the graphical user interface 314. For example, the user may select the sticky interface element 342 and the sticky application engine 360 may output a message to the user, such as by displaying the message, generating an audible output, or the like, instructing the user to drag-and-drop the representation of the OS level application 340 onto the place in the web page 324 where the sticky application 316 is to be represented.

When the user performs the placement operation, the sticky application engine 360 monitors the pixel locations of the sticky application 316 and uses the pixel locations of the sticky application 316 when representing the sticky application 316 via the graphical user interface 314. That is, the sticky application engine 360, when communicating with the display driver 364 to cause the display driver 364 to generate a representation of the sticky application 316, uses these pixel locations to inform the display driver 364 where on the display of the client computing device 310 to represent the sticky application 316. These pixel locations may be the location of every pixel making up the representation of the sticky application 316 within the web page 324 representation, a range of pixel locations, such as by designating coordinates for two or more corners of the representation, or the like.

The coordinates of the pixel locations of the sticky application 316 may be relative to a coordinate system of the representation of the web page 324, for example. Alternatively, the coordinate system may be that of the desktop display of the client computing device 310, or any other suitable coordinate system. Thus, in one illustrative embodiment, the location of a sticky application 316 may be specified in the sticky application engine 360 as an absolute pixel position of another underlying application, e.g., the representation of the web-based application's web page 324 in the graphical user interface 314 of the web browser application instance 312.

With the mechanisms of the illustrative embodiments, the sticky application engine 360 causes the representation of the sticky application 316 to appear to be present within the web page 324. However, in one illustrative embodiment, the functionality of the sticky application 316 is still managed by the operating system 350 via its thread level support of the OS level application 340. That is, the OS level application 340 instance is not closed in response to the generation of the sticky application 316 representation and the thread(s) associated with the OS level application 340 are not paused or otherwise suspended in response to the generation of the sticky application 316 representation. Thus, the sticky application engine 360 only modifies the representation of the OS level application 340 to appear as sticky application 316 with its functionality not being affected by sticky application engine 360.

The sticky application engine 360 further includes an event registration and monitoring engine 362 through which the sticky application engine 360 registers with the event engine 370 of the web browser application instance 312 to receive event notifications when the representation of the web page 324 is altered or the user otherwise interacts with the web page 324 representation, such as via inputting information into fields, scrolling the representation of the web page 324, changing the size of the representation of the web page 324, or the like. The sticky application engine 360 may initiate the registration of the sticky application 316 for event notifications in response to the user selecting the sticky interface element 342 and thus, may perform the registration operations in substantially a parallel manner with the user's operations for placing the sticky application 316 in the representation of the web page 324.

The event engine 370, in response to receiving the event registration from the event registration and monitoring engine 362, stores an entry in the event registration data structure 372. Entries in the event registration data structure 372 may store, for example, an identifier of the web page 324 with which a sticky application 316 is associated, an identifier of the OS level application 340 associated with the sticky application 316, and other information that may aid in facilitating representation of the sticky application 316 as part of the web page 324. Based on the entries in the event registration data structure 372, the event engine 370 generates and sends event notifications to the sticky application engine 360 in response to changes in the representation of the web page 324 and/or user input to the graphical user interface 314 representing the web page 324 being received.

The event engine 370 monitors changes to the representation of web pages 324 in the graphical user interface 314 and, in response to a change or input, sends an event notification to the event registration and monitoring engine 362 of the sticky application engine 360 specifying the change or input, the web page 324 that was modified and the OS level application 340 that corresponds to the sticky application 316 in the web page 324. In response to the event notification, the logic 368 of the sticky application engine 360 determines how the event affects the representation of the sticky application 316 and generates appropriate commands to the display driver 364 for modifying a representation of the sticky application 316 in the web page 324 via the graphical user interface 314. The particular commands that are sent are dependent upon the type of modification performed by the user, i.e. the particular event.

For example, if the user has moved a scroll bar associated with the graphical user interface 314, the pixel location of the sticky application 316 must move along with the representation of the web page 324 in order for the sticky application 316 to appear as being part of the web page 324. Thus, in response to an event specifying a movement of the scroll bar by a certain amount, the sticky application engine 360 calculates a new position within the graphical user interface 314 for the sticky application 316 such that its relative position within the representation of the web page 324 is maintained. Corresponding commands are then sent to the display driver 364 to ensure proper representation of the sticky application in the graphical user interface 314. It should be appreciated that in some cases such scrolling may cause the sticky application 316 to no longer be visible, or at least be partially not visible, on the display of the client computing device 310 even though its representation is still part of the representation of the web page 324.

Similarly, if the user, via the graphical user interface 314, browses to a different web page than web page 324, the sticky application 316 may be removed from being visible on a display of the client computing device 310. However, the association of the sticky application 316 with the web page 324 may still be maintained by the event engine 370 and the sticky application engine 360 in case the user returns to the web page 324. Moreover, the sticky application 316 is still running during this time period and its thread(s) continue to run in the OS 350, i.e. even though the sticky application is not visible, this does not mean that the sticky application 316 has been closed. Because it is an OS level application 340, the sticky application 316 will continue to run. Thus, upon the user returning to the web page 324, the sticky application 316 may again be displayed via the graphical user interface 314 as part of the web page 324 and event notifications may still be received via the event engine 370.

It should be appreciated that the underlying session between the web browser application instance 312 and the web based application 322 may be discontinued while the sticky application 316 is still associated with the web page 324. In such an event, i.e. the closing of connection with the web-based application 322, the sticky application 316 itself may still be maintained in association with the web page 324 and thus, may still be interacted with by the user. Such may be the case until it is no longer possible to access the data required for representing the web page 324. In other words, as long as the web page 324 may be represented in the graphical user interface 314, the sticky application 316 may be integrated with the web page 324. Thus, for example, offline access to the web page 324 may be obtained via the graphical user interface 314 of the web browser application instance 312 with the sticky application 316 being able to be maintained as part of the web page 324.

In the event that the data for representing the web page 324 no longer is available, or if the user again selects the sticky interface element 342 for removing the sticky application 316, the sticky application 316 may be removed from the web page 324 and the representation of the OS level application 340 may be returned to a standard OS level application representation within the operating system 350. Thus, an OS level application 340 may be represented as a sticky application 316 and then returned to an OS level application 340 representation when necessary.

As mentioned above, the OS level application 340 may be stuck to any pixel location within the web page 324 representation to thereby generate the sticky application 316. However, it should be appreciated that it is not required that the entire OS level application 340 representation be present within the borders of the web page 324 representation. To the contrary, a portion of the sticky application 316 may be permitted to exist outside of the borders of web page 324 representation, and even possibly outside the borders of the graphical user interface 314 of the web browser application instance 312. In other words, the sticky application 316 representation on the display of the client computing device 310 may exist entirely within the web page 324 representation, partially in the web page 324 representation and partially in the graphical user interface 314, or even partially within the graphical user interface 314 and web page 324 representation, and partially outside of the graphical user interface 314 of the web browser application instance 312. In this way, the sticky application 316 representation may appear to overhang the web page 324 representation and/or the graphical user interface 314. Even though the sticky application 316 representation may overhang, when the web page 324 representation is scrolled, resized, or the like, the sticky application 316 as a whole will be scrolled, resized, and the like, based on the modification of the representation of the web page 324, including the portion of the sticky application 316 representation that overhangs.

The above illustrative embodiments are described in terms of the OS level application 340 being "stuck" to a web page 324 representation generated by a web based application 322 using a web browser application instance 312. However, the illustrative embodiments are not limited to use only with web-based applications or web page representations. To the contrary, the illustrative embodiments may stick any OS level application to any other application as long as events associated with the application to which the OS level application is stuck may be received and monitored by the sticky application engine so that the sticky application representation may be updated when the representation of the application to which it is stuck is changed.

It should further be appreciated that while the above illustrative embodiments are described with regard to a user selecting a sticky interface element 342 and then placing the OS level application 340 at a pixel location within the web page 324, the illustrative embodiments are not limited to such. For example, in one illustrative embodiment, a user may move the representation of the OS level application 340 in a desktop display of the client computing device 310 over the web page 324 representation and then select the sticky interface element 342 in order to generate the sticky application 316. In such an embodiment, the sticky interface element 342 may not be visible in a toolbar or the like of a representation of the OS level application 340 unless the OS level application 340 representation is currently over an application representation to which the OS level application 340 may be stuck.

Moreover, it should be appreciated that the mechanisms of the illustrative embodiments may support multiple levels of sticky applications thereby generating nested sticky applications. That is, a sticky application may be stuck to an already existing sticky application in which case the already existing sticky application may operate in much the same manner as the web page 324 representation described above with regard to the sticky application that is currently being stuck. Thus, multiple entries in the event registration data structure 372 may be affected by an update to the representation of an underlying application, e.g., web page 324, and multiple event notifications may be sent to the sticky application engine 360. Each representation of a sticky application in the nested set of sticky applications may be updated individually based on the modification to the representation of the web page 324 and/or any sticky application 316 to which the nested sticky application is stuck.

Figure 4:
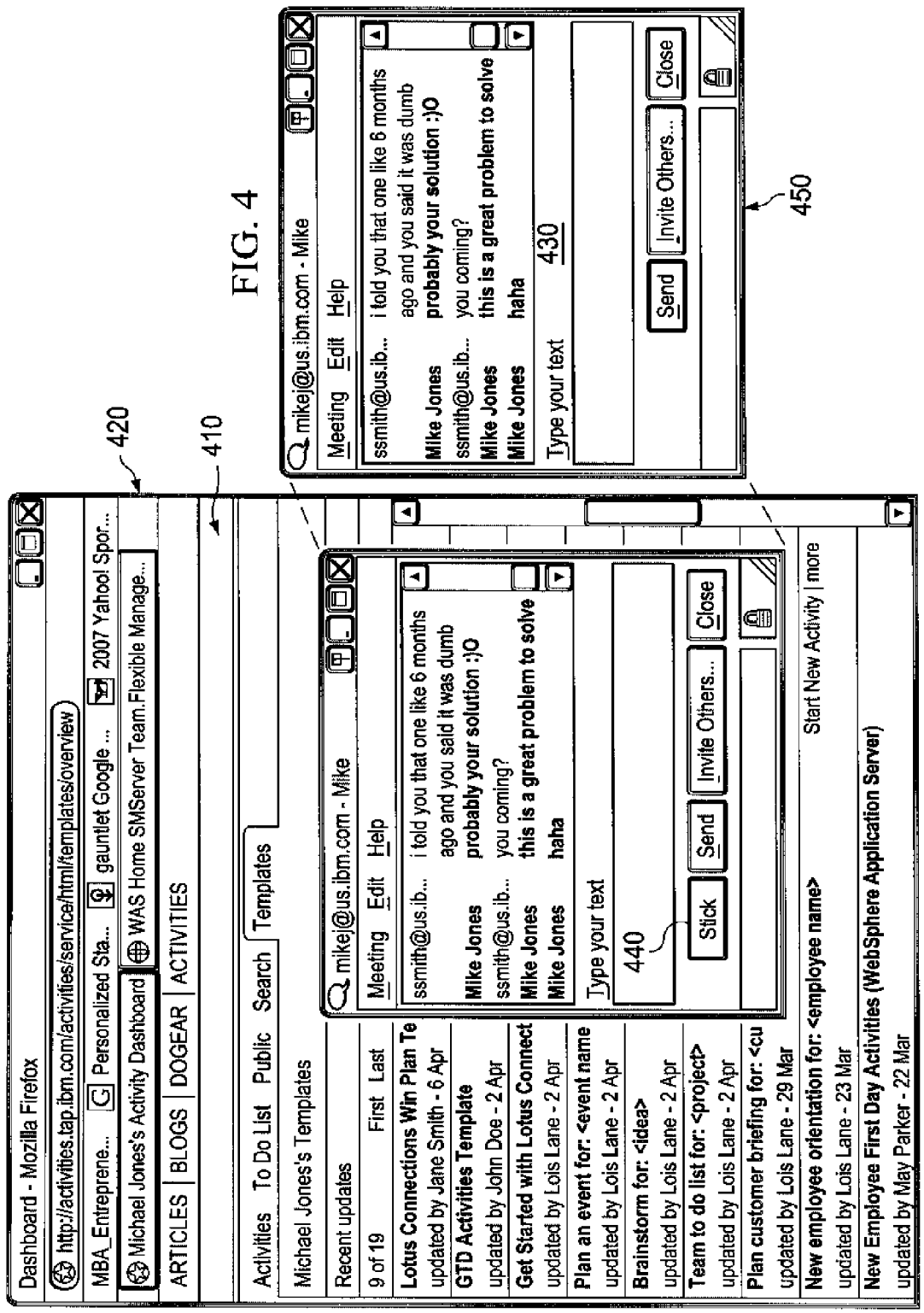
FIG. 4 is an exemplary diagram of a display illustrating an operation of sticking an operating system based, or operating system level, application to a web based application in accordance with one illustrative embodiment.

FIG. 4 is an exemplary diagram of a display illustrating an operation of sticking an operating system based, or operating system level, application to a web based application in accordance with one illustrative embodiment. As can be seen in FIG. 4, a main application, which in this example is a web-based application, generates a web page 410 within a web browser application instance 420, which in this case is the FireFox™ web browser application available from Mozilla.

An instant messaging OS level application 450 is also being run on the same client computing device and the user wishes to have access to this OS level application while interfacing with the web based application via its web page 410. Thus, the user drags the window 430 in which the OS level application is present over the web page 410 representation in the web browser application instance 420. As a result, a sticky application interface element 440 appears in association with the window 430 allowing the user to select the element 440 in order to stick the instant messaging application 450 to the web page 410. As a result of the sticking operation, the instant messaging application 450 will remain in the same relative position within the web page 410 as shown in FIG. 4 even if the web page 410 has its representation modified through scrolling, resizing, or the like.

Figure 5:
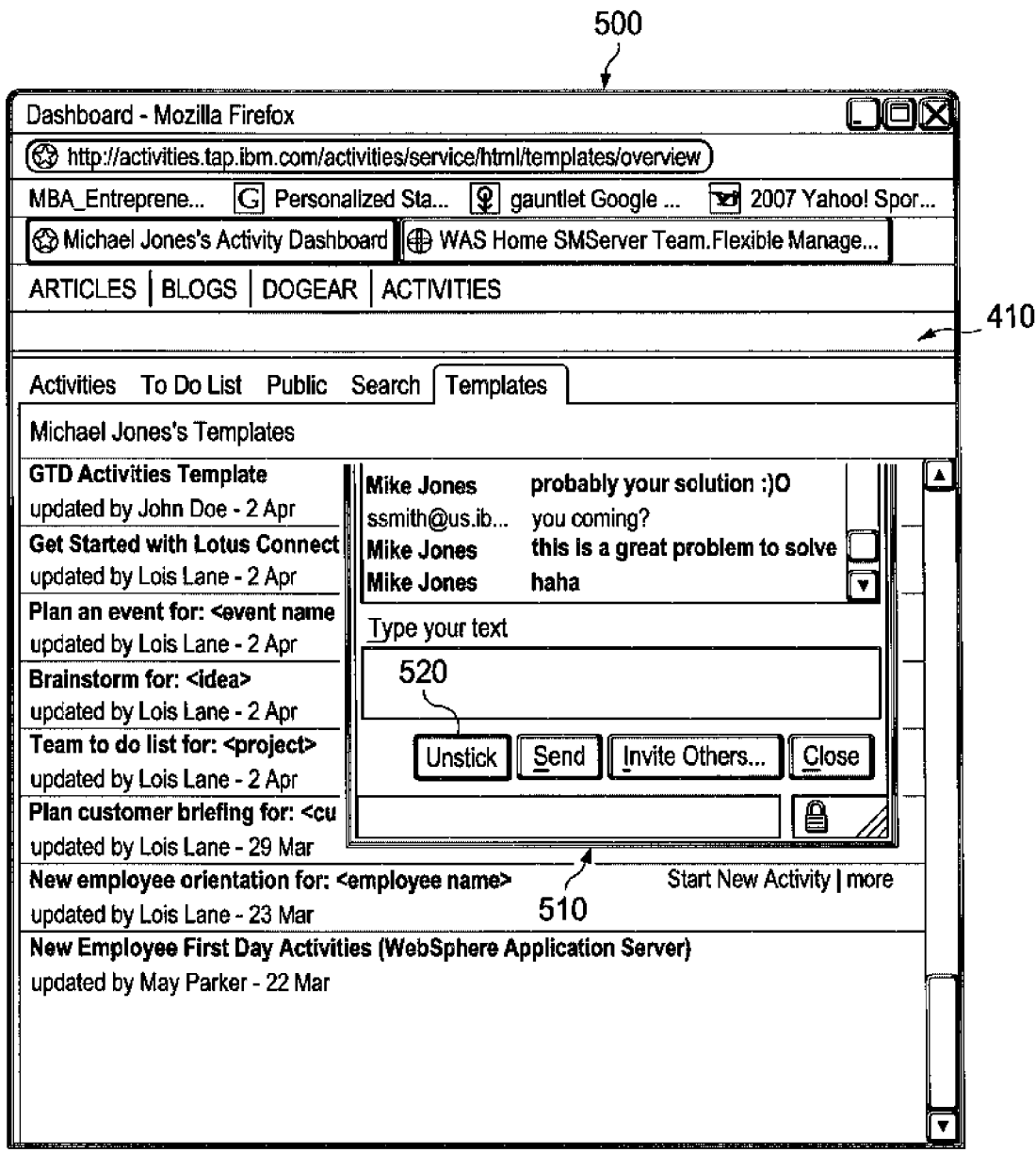
FIG. 5 is an exemplary diagram illustrating a change in display of a sticky application due to a modification of the display of an associated main web based application in accordance with one illustrative embodiment.

FIG. 5 is an exemplary diagram illustrating a change in display of a sticky application due to a modification of the display of an associated main application in accordance with one illustrative embodiment. Assume that the main application and sticky application are as shown in FIG. 4 above. FIG. 5 shows the result of a user scrolling the display of the main application, i.e. web page 410, down. As shown, a portion of the web page 410 previously visible is no longer visible within the web browser window 500. Similarly, a portion of the sticky application 510 is also not visible relative to the display shown in FIG. 4. The location of the sticky application relative to the main application is maintained even when the display of the main application is modified. It should also be noted that the sticky application interface element 440 has been changed, as a result of the sticking operation, to an "Unstick" element 520 which may be used to unstick the sticky application from the web page 410.

It can be appreciated that in the case of nested sticky applications, or in the case where multiple sticky applications are being utilized, it is desirable to have user friendly mechanism for accessing the various sticky applications and determining the nested structure of the sticky applications. In one illustrative embodiment, a visual representation of the sticky applications relative to their respective main application, i.e. the base application to which all of the sticky applications are stuck either directly or indirectly through another sticky application. Returning again to FIG. 3, in the above illustrative embodiments, when the sticky application 316 is generated for an OS level application 340, the OS level application representation of the application 340 may disappear from the desktop display on the client computing device 310 and thus, the representation of the OS level application 340 may disappear from any toolbar or taskbars of the desktop display.

The illustrative embodiments provide mechanisms for associating toolbar or taskbar representations of the sticky applications currently present within the desktop display. FIG. 6A is an exemplary diagram illustrating a toolbar 600 representation of stick applications in accordance with one illustrative embodiment. The representations of the sticky applications are provided in association with toolbar or taskbar representations of their respective main applications 610 in a nested format. This nested format representation may be used to access the sticky application by bringing its associated main application to the forefront of the desktop display. Moreover, the nested format representation may be used to select a particular sticky application for purposes of unsticking it from its associated main application and automatically causing an OS level application representation to be generated for the unstuck application on the desktop display.

For example, a user may have been previously working on a web based application 322 within a web browser application instance 312, such as FireFox, Microsoft Internet Explorer, or the like. During the course of the user's work, the user sticks Apple iTunes™ and Eclipse™ on the web application's web page 324. Assume that the user wishes to find iTunes™ and make it unstuck since the user is done working with the web based application 322. The user then moves the computer mouse attached to the client computing device 310 over the web application's icon 610 on the task bar of the desktop display. The operating system 350 detects a hover of the mouse's associated pointer over the task bar icon 610 and shows a pop-up display 620 identifying the sticky applications 630 and 640 that the particular web application contains. The sticky applications 630 and 640 are presented in a nested tree format indicating the structure that allows some sticky applications to contain other sticky applications.

The user may then move their mouse pointer over the sticky applications 630 and 640 in the pop-up display 620 with a color or other change in display indicating the current selection. The user may select the iTunes™ sticky application from the pop-up display 620 and, in response, the iTunes™ application may become unstuck from the web application. The iTunes™ application, now restored to an OS level representation, may have a task bar icon added to the task bar 600 as it is again a normal OS level application. This is shown in the task bar 650 of FIG. 6B.

It should be appreciated, as mentioned above, that instead of unsticking the sticky application in response to selection of the sticky application from the pop-up display 620, other actions may be selected for performance on the sticky application. For example, a user may "right click" on the sticky application entry in the pop-up display 620 to obtain a menu of other possible actions that may be performed.

Moreover, the user may select an entry in the pop-up display 620 representing a sticky application and then drag-and-drop it on another icon representing a different main application. In response, the sticky application may be unstuck from the first main application and stuck to the different main application using the same pixel coordinates that were used in the first main application. The sticky application engine 360 may perform the necessary operations for unregistering and re-registering the sticky application in order to facilitate the move of the sticky application from one main application to another main application Furthermore, if the sticky application that is moved has its own nested sticky applications, all of the sticky applications in the nested structure associated with the moved sticky application may themselves be moved along with the selected sticky application that is moved.

In addition to presenting entries corresponding to sticky applications in a pop-up display, or other type of user interface element, associated with a main application to which the sticky applications are stuck, the illustrative embodiments further provide mechanisms for displaying an indication of an alert associated with a sticky application using the icon of the main application with which the sticky application is associated. For example, a portion of the main application's icon in the task bar of a desktop display may be highlighted, flashed, or the like, to indicate the occurrence of an alert in an associated sticky application. The portion of the main application's icon that has its display modified to indicate an alert may be determined based on the pixel location of the sticky application within the main application, for example. Alternatively, the portion may be a fixed portion predetermined for any sticky application, regardless of its pixel location.

For example, if the sticky application having the alert is stuck to an upper right portion of the main application's representation, then an upper right portion of the main application's icon may have its display altered to indicate the occurrence of the alert. In this way, the location of the sticky application within the main application may be mapped to a location of an alert indicator within the main application's icon.

Similarly, based on a size of the sticky application representation within the main application representation, a correspondingly sized portion of the main application's icon may have its display modified to indicate the occurrence of the alert. For example, if the sticky application representation is 20% of the main application's representation, then 20% of the main application's icon may be modified to indicate the alert. By only modifying a portion of the main application's icon, the user is informed that a sticky application is generating the alert and not the main application.

The portion of the main application's icon in the task bar that has its display modified to indicate the alert may be flashed, highlighted, or the like, using a different color than that of an alert indicator of the main application. In this way, if alerts are generated by both the main application and the sticky application, the user can determine that both the main application and sticky application have alerts as indicated by the different colored portions of the main application's icon. Moreover, other types of differentiation between portions of the main application icon may be used including different flash rates and the like.

FIG. 7 is an exemplary diagram illustrating a toolbar representation of alerts in sticky applications in accordance with one illustrative embodiment. As shown in FIG. 7, the main application icon 710 for the web application Yahoo Movies has a portion 720 corresponding to a sticky application that has been previously stuck to the web application. This portion 720 is highlighted or flashed with a different representation from that of the other portion of the main application icon 710 to indicate that the sticky application is generating an alert. As mentioned above, the difference in representation of the portion 720 may be performed using different colors, different flash rates, different highlighting, or any other means of differentiating the portion 720 from the rest of the main application icon 710.

Thus, the illustrative embodiments provide mechanisms for sticking OS level applications to other applications, such as web-based applications such that the representation of the OS level applications are integrated into the representation of the other applications. In this way, the OS level application may be made visible and may be interacted with even while the user is viewing and/or interacting with the application with which the OS level application is stuck. This greatly reduces the frustration on the part of the user when interacting with two different applications. In addition, the illustrative embodiments provide task bar mechanisms for identifying and selecting sticky applications and their associated alerts.

FIGS. 8-11 are flowcharts outlining various operations of one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 8:
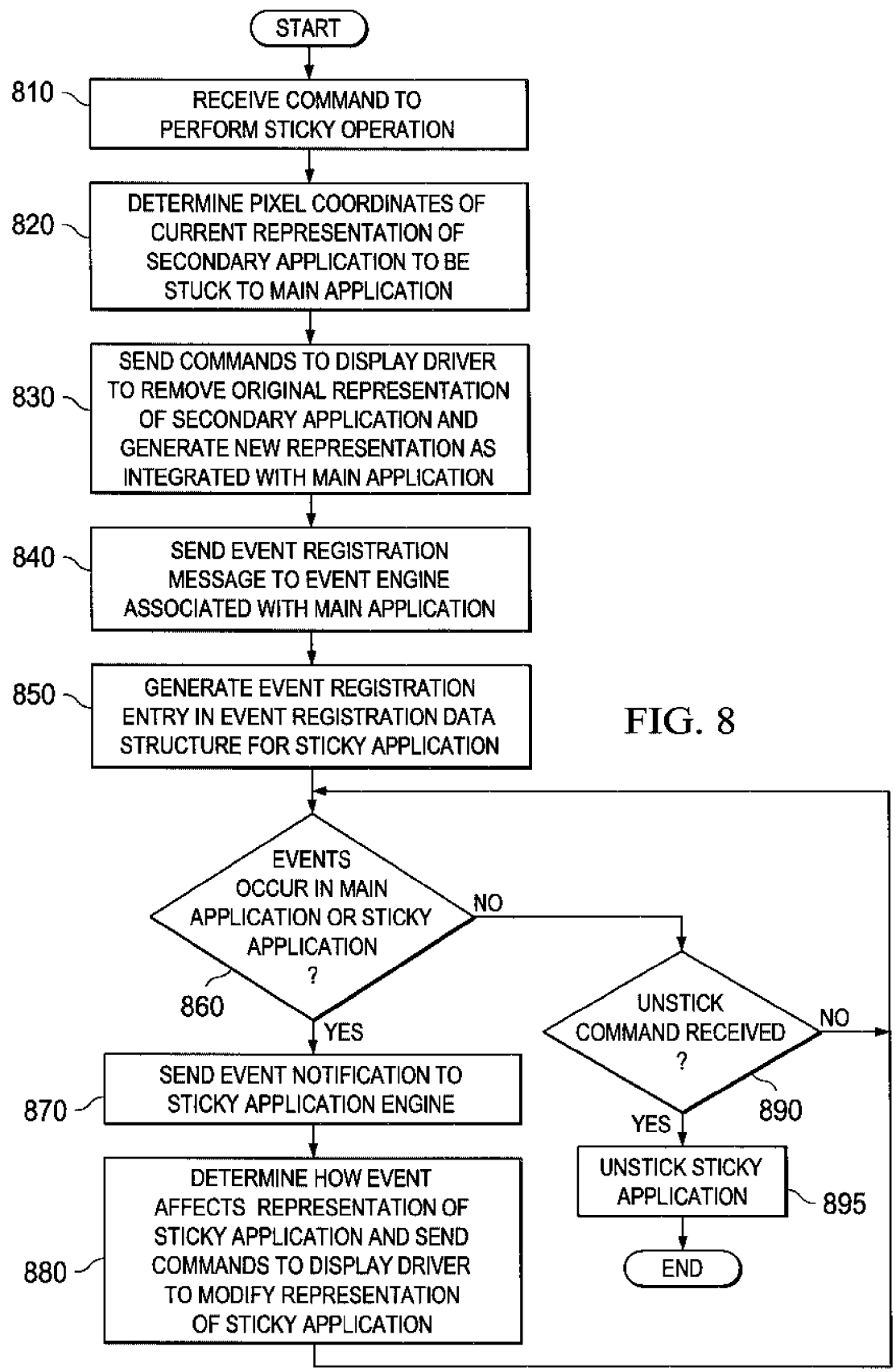
FIG. 8 is a flowchart outlining an exemplary operation for sticking an operating system-based application to a web-based application in accordance with one illustrative embodiment.

FIG. 8 is a flowchart outlining an exemplary operation for sticking an operating system-based application to another application in accordance with one illustrative embodiment. As shown in FIG. 8, the operation for sticking an OS level application to another application, such as a web-based application, starts by the sticky application engine receiving a command to performing a sticking operation for sticking a secondary application to a main application (step 810). The sticky application engine determines the pixel coordinates of the current representation of the secondary application and generates a data structure within the sticky application engine identifying the pixel location of the secondary application relative to the main application (step 820). The sticky application engine sends commands to a display driver for removing the original representation of the secondary application and generating a new representation of the secondary application as being integrated with the main application, using the data structure within the sticky application engine (step 830).

The sticky application engine sends an event registration message to an event engine associated with the main application (step 840). The event engine generates an entry in an event registration data structure for the sticky application (step 850). A determination is made as to whether any events occur with regard to the representation of the main application and/or the sticky application (step 860). If so, an event notification is sent to the sticky application engine (step 870). The sticky application engine determines how the event affects the representation of the sticky application relative to the main application and sends commands to the display driver to generate a modified representation of the sticky application based on the determined affects (step 880).

If no events have occurred, the operation determines if a command has been received to unstick the sticky application (step 890). If not, the operation returns to step 860. If a command has been received to unstick the sticky application, the sticky application is unstuck in the manner described in FIG. 9 hereafter (step 895) and the operation then terminates.

Figure 9:
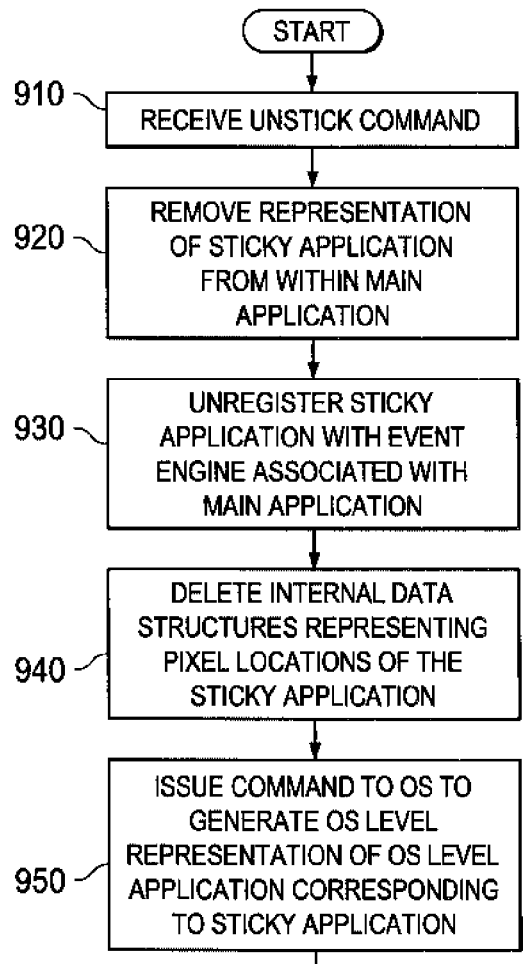
FIG. 9 is a flowchart outlining an exemplary operation for unsticking a sticky application from a web-based application in accordance with one illustrative embodiment.

FIG. 9 is a flowchart outlining an exemplary operation for unsticking a sticky application from a web-based application in accordance with one illustrative embodiment. As shown in FIG. 9, the operation starts with the sticky application engine receiving a command to unstick a sticky application (step 910). The sticky application engine removes the representation of the sticky application from within the main application (step 920) and unregisters the sticky application with the event engine of the main application (step 930). The sticky application engine then deletes its internal data structures representing the pixel locations of the sticky application (step 940) and issues a command to the operating system to generate an OS level representation of the OS level application corresponding to the sticky application (step 950). The operation then terminates.

Figure 10:
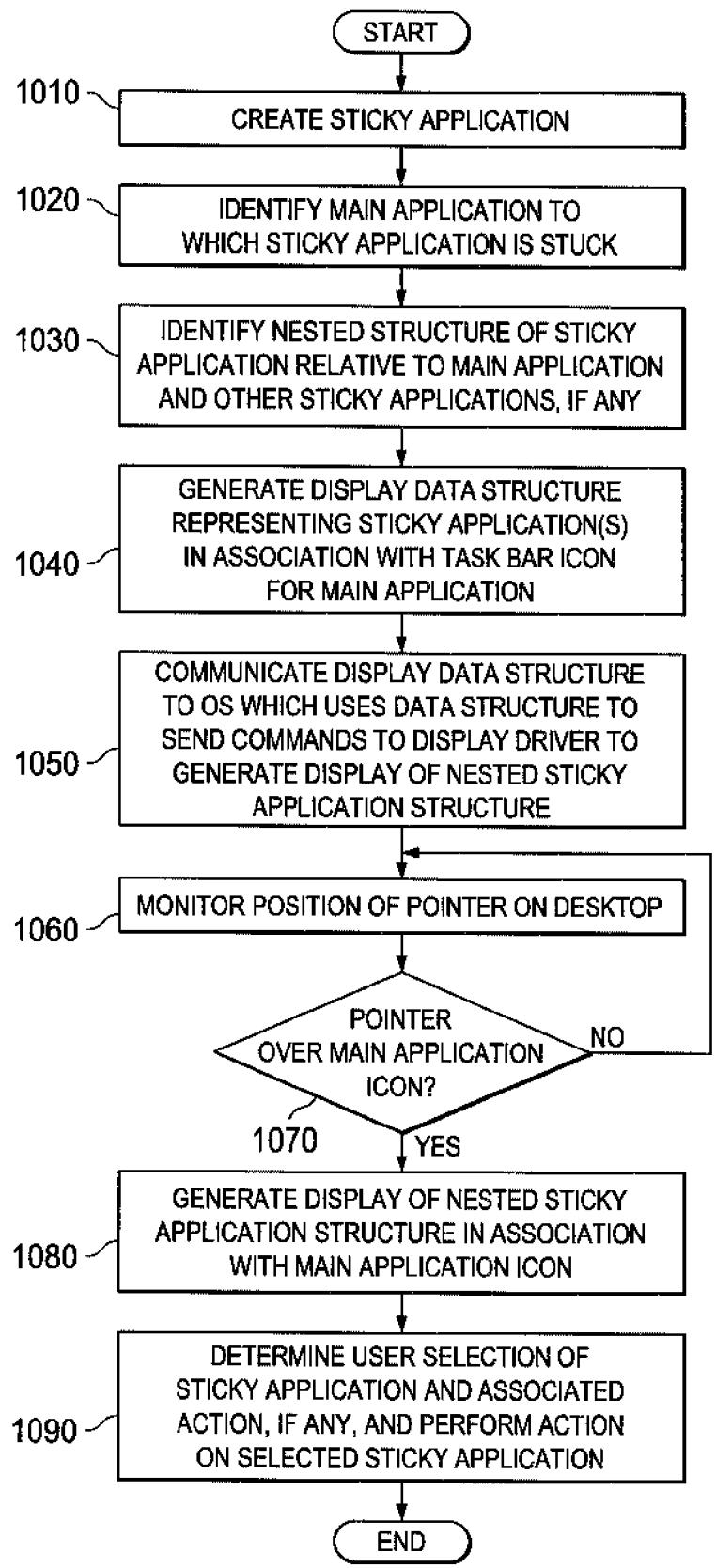
FIG. 10 is a flowchart outlining an exemplary operation for generating a taskbar to represent sticking applications in accordance with one illustrative embodiment.

FIG. 10 is a flowchart outlining an exemplary operation for generating a taskbar to represent sticking applications in accordance with one illustrative embodiment. As shown in FIG. 10, the operation starts with the creation of a sticky application, such as through the operation outlined in FIG. 8 above (step 1010). The sticky application engine identifies the main application to which the sticky application is stuck (step 1020). The sticky application engine further identifies a nested position of the sticky application relative to the main application by identifying any other sticky applications having pixel locations overlapping the current sticky application (step 1030). Based on the determined nested position and the main application, a display data structure of the nested position of the sticky application(s) is generated in association with a task bar icon of the main application (step 1040). The display data structure of the nested position of the sticky application(s) is communicated to the operating system which uses this data structure to communicate with a display driver how to generate a display of the nested position of the sticky application(s) in a desktop display on a client computing device (step 1050).

The operating system then monitors the position of a pointer on the desktop display to determine if the display of the nested position of the sticky application(s) is to be displayed (step 1060). The operating system then determines if a user has placed a pointer over the main application task bar icon (step 1070). If not, the operation returns to step 1060. If the pointer is over the main application task bar icon, then the nested position of the sticky application(s) display is generated, e.g., a pop-up display identifying the nested structure of the sticky application(s) may be generated (step 1080). The operating system then determines a user's selection of an action associated with one of the sticky application(s), if any, and performs an associated action (step 1090). The operation then terminates.

Figure 11:
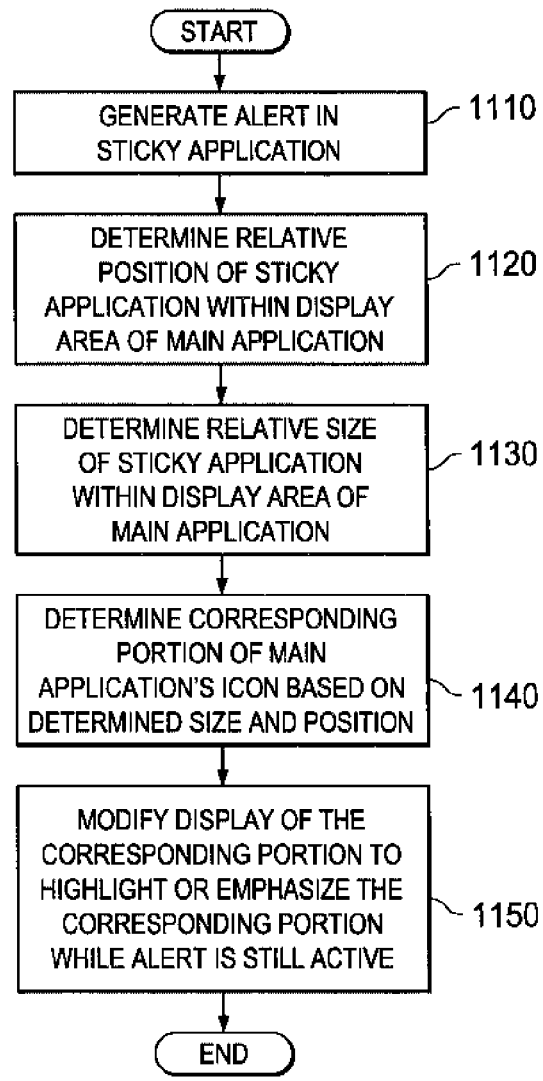
FIG. 11 is a flowchart outlining an exemplary operation for displaying information regarding sticky application alerts via a toolbar in accordance with one illustrative embodiment.

FIG. 11 is a flowchart outlining an exemplary operation for display information regarding sticky application alerts via a toolbar in accordance with one illustrative embodiment. As shown in FIG. 11, the operation starts with an alert being generated in a sticky application (step 1110). The sticky application engine determines a relative position of the sticky application within the display area of a main application associated with the sticky application (step 1120). The sticky application engine further determines a relative size of the sticky application within the display area of the main application associated with the sticky application (step 1130). A corresponding portion of a task bar icon for the main application is determined based on the determined position and size of the sticky application within the display area of the main application (step 1140). The display of the corresponding portion is then modified to highlight or otherwise display that corresponding portion in a conspicuous manner (step 1150). The operation then terminates.

It should be appreciated that the illustrative embodiments may take the form of a specialized hardware embodiment, a software embodiment that is executed on a computer system having general processing hardware, or an embodiment containing both specialized hardware and software elements that are executed on a computer system having general processing hardware. In one exemplary embodiment, the mechanisms of the illustrative embodiments are implemented in a software product, which may include but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, or semiconductor system, apparatus, or device. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read-only memory (CD-ROM), compact disk-read/write (CD-R/W) and DVD.

The program code of the computer program product may comprise instructions that are stored in a computer readable storage medium in a client or server data processing system. In a client data processing system embodiment, the instructions may have been downloaded over a network from one or more remote data processing systems, such as a server data processing system, a client data processing system, or a plurality of client data processing systems using a peer-to-peer communication methodology. In a server data processing system embodiment, the instructions may be configured for download, or actually downloaded, over a network to a remote data processing system, e.g., a client data processing system, for use in a computer readable storage medium with the remote data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for representing a first application on a display of the data processing system, comprising:
   receiving a command to stick a first graphical representation of a first application to a second graphical representation of a second application on the display of the data processing system; and
   generating a third graphical representation of the first application, wherein the third graphical representation of the first application appears to be integrated with the second graphical representation of the second application, wherein the first application may be interacted with by a user via the third graphical representation, and wherein the third graphical representation is automatically modified in response to modifications to the second graphical representation of the second application.

2. The method of claim 1, wherein the first application is an operating system (OS) level application.

3. The method of claim 1, wherein generating the third graphical representation comprises:
   identifying at least one relative pixel location of the first graphical representation relative to the second graphical representation;
   generating the third graphical representation at the at least one relative pixel location; and
   maintaining the at least one relative pixel location of the third graphical representation relative to the second graphical representation while the second graphical representation is modified.

4. The method of claim 3, wherein maintaining the at least one relative pixel location of the third graphical representation relative to the second graphical representation comprises:
   in response to receiving an input to scroll the second graphical representation, scrolling the third graphical representation a corresponding amount such that the at least one relative pixel location of the third graphical representation relative to the second graphical representation is maintained.

5. The method of claim 3, wherein maintaining the at least one relative pixel location of the third graphical representation relative to the second graphical representation comprises:
   in response to receiving an input to resize the second graphical representation, resizing the third graphical representation a corresponding amount such that the at least one relative pixel location of the third graphical representation relative to the second graphical representation is maintained.

6. The method of claim 3, wherein maintaining the at least one relative pixel location of the third graphical representation relative to the second graphical representation comprises:
   in response to receiving an input to no longer display the second graphical representation, discontinuing display of the third graphical representation but maintaining the at least one relative pixel location of the third graphical representation relative to the second graphical representation in memory such that if the second graphical representation is again displayed, the third graphical representation is also displayed at the at least one relative pixel location.

7. The method of claim 1, wherein the second application is a web-based application and wherein the second graphical representation is a web page.

8. The method of claim 1, wherein the second application is an application whose graphical representation is already integrated with a web page of a web-based application.

9. The method of claim 1, further comprising:
   generating a taskbar representation output on the display, wherein the taskbar comprises a first taskbar portion identifying the second application; and
   generating a second taskbar portion in association with the first taskbar portion, the second taskbar portion identifying the first application as being stuck to the second application.

10. The method of claim 9, wherein the second taskbar portion comprises a hierarchical representation of applications stuck to the second application, wherein individual applications stuck to the second application may be selected from the hierarchical representation in order to perform operations on the applications stuck to the second application.

11. The method of claim 9, further comprising:
receiving an alert notification from the first application; and
modifying an output characteristic of a portion of the first taskbar portion to identify the receipt of the alert notification.

12. The method of claim 11, wherein the portion of the first taskbar portion is a portion of the first taskbar portion corresponding to characteristics of the third representation relative to the second representation.

13. The method of claim 12, wherein the characteristics of the third representation relative to the second representation comprises at least one of a relative pixel location of the third representation relative to the second representation or a size of the third representation relative to the second representation.

14. A computer program product comprising a computer readable storage medium having a computer readable program, wherein the computer readable program, when executed on a computing device, causes the computing device to:
receive a command to stick a first graphical representation of a first application to a second graphical representation of a second application on the display of the data processing system; and
generate a third graphical representation of the first application, wherein the third graphical representation of the first application appears to be integrated with the second graphical representation of the second application, wherein the first application may be interacted with by a user via the third graphical representation, and wherein the third graphical representation is automatically modified in response to modifications to the second graphical representation of the second application.

15. The computer program product of claim 14, wherein the first application is an operating system (OS) level application, and wherein the second application is a web-based application and the second graphical representation is a web page.

16. The computer program product of claim 14, wherein the computer readable program causes the computing device to generate the third graphical representation by:
identifying at least one relative pixel location of the first graphical representation relative to the second graphical representation;
generating the third graphical representation at the at least one relative pixel location; and
maintaining the at least one relative pixel location of the third graphical representation relative to the second graphical representation while the second graphical representation is modified.

17. The computer program product of claim 16, wherein the computer readable program causes the computing device to maintain the at least one relative pixel location of the third graphical representation relative to the second graphical representation by:
in response to receiving an input to scroll the second graphical representation, scrolling the third graphical representation a corresponding amount such that the at least one relative pixel location of the third graphical representation relative to the second graphical representation is maintained.

18. The computer program product of claim 16, wherein the computer readable program causes the computing device to maintain the at least one relative pixel location of the third graphical representation relative to the second graphical representation by:
resizing, in response to receiving an input to resize the second graphical representation, the third graphical representation a corresponding amount such that the at least one relative pixel location of the third graphical representation relative to the second graphical representation is maintained.

19. The computer program product of claim 16, wherein the computer readable program causes the computing device to maintain the at least one relative pixel location of the third graphical representation relative to the second graphical representation by:
discontinuing, in response to receiving an input to no longer display the second graphical representation, display of the third graphical representation but maintaining the at least one relative pixel location of the third graphical representation relative to the second graphical representation in memory such that if the second graphical representation is again displayed, the third graphical representation is also displayed at the at least one relative pixel location.

20. The computer program product of claim 14, wherein the computer readable program further causes the computing device to:
generate a taskbar representation output on the display, wherein the taskbar comprises a first taskbar portion identifying the second application; and
generate a second taskbar portion in association with the first taskbar portion, the second taskbar portion identifying the first application as being stuck to the second application.

21. The computer program product of claim 20, wherein the second taskbar portion comprises a hierarchical representation of applications stuck to the second application, and wherein individual applications stuck to the second application may be selected from the hierarchical representation in order to perform operations on the applications stuck to the second application.

22. The computer program product of claim 20, wherein the computer readable program further causes the computing device to:
receive an alert notification from the first application; and
modify an output characteristic of a portion of the first taskbar portion to identify the receipt of the alert notification, wherein the portion of the first taskbar portion is a portion of the first taskbar portion corresponding to characteristics of the third representation relative to the second representation, and wherein the characteristics of the third representation relative to the second representation comprises at least one of a relative pixel location of the third representation relative to the second representation or a size of the third representation relative to the second representation.

23. The computer program product of claim 14, wherein the computer readable program comprises instructions that are stored in a computer readable storage medium in a data processing system, and wherein the instructions were downloaded over a network from a remote data processing system.

24. The computer program product of claim 14, wherein the computer readable program comprises instructions that are stored in a computer readable storage medium in a server data processing system, and wherein the instructions are downloaded over a network to a remote data processing system for use in a computer readable storage medium with the remote data processing system.

25. An apparatus, comprising:
at least one processor; and
a memory coupled to the at least one processor, wherein the memory comprises instructions which, when executed by the at least one processor, cause the at least one processor to:
receive a command to stick a first graphical representation of a first application to a second graphical representation of a second application on the display of the data processing system; and
generate a third graphical representation of the first application, wherein the third graphical representation of the first application appears to be integrated with the second graphical representation of the second application, wherein the first application may be interacted with by a user via the third graphical representation, and wherein the third graphical representation is automatically modified in response to modifications to the second graphical representation of the second application.

* * * * *